US006957770B1

(12) United States Patent
Robinson (10) Patent No.: US 6,957,770 B1
(45) Date of Patent: Oct. 25, 2005

(54) SYSTEM AND METHOD FOR BIOMETRIC AUTHORIZATION FOR CHECK CASHING

(75) Inventor: Timothy Robinson, Herndon, VA (US)

(73) Assignee: BioPay, LLC, Herndon, VA (US)

( * ) Notice: Subject to any disclaimer, the term of this patent is extended or adjusted under 35 U.S.C. 154(b) by 35 days.

(21) Appl. No.: 10/142,687

(22) Filed: May 10, 2002

(51) Int. Cl.$^7$ .............................................. G06K 5/00
(52) U.S. Cl. ..................... 235/382; 235/381; 235/383; 235/375
(58) Field of Search ............................... 235/379, 380, 235/375, 382, 383, 381; 705/10, 14, 44

(56) References Cited

U.S. PATENT DOCUMENTS

| | | | |
|---|---|---|---|
| 4,672,377 A | * | 6/1987 | Murphy et al. ............. 340/5.41 |
| 4,975,969 A | | 12/1990 | Tal |
| 4,993,068 A | | 2/1991 | Piosenka et al. |
| 4,995,086 A | | 2/1991 | Lilley et al. |
| 5,053,607 A | | 10/1991 | Carlson et al. |
| 5,095,194 A | | 3/1992 | Barbanell |
| 5,144,680 A | | 9/1992 | Kobayashi et al. |
| 5,341,428 A | * | 8/1994 | Schatz ........................ 713/185 |
| 5,386,103 A | | 1/1995 | DeBan et al. |
| 5,448,471 A | | 9/1995 | Deaton et al. |
| 5,469,506 A | | 11/1995 | Berson et al. |
| 5,513,272 A | | 4/1996 | Bogosian, Jr. |
| 5,581,630 A | | 12/1996 | Bonneau, Jr. |
| 5,592,377 A | | 1/1997 | Lipkin |
| 5,613,012 A | | 3/1997 | Hoffman et al. |
| 5,802,199 A | | 9/1998 | Pare, Jr. et al. |
| 5,838,812 A | * | 11/1998 | Pare et al. ................... 382/115 |
| 6,009,411 A | | 12/1999 | Kepecs |
| 6,012,039 A | | 1/2000 | Hoffman et al. |
| 6,023,688 A | * | 2/2000 | Ramachandran et al. ..... 705/44 |
| 6,145,738 A | | 11/2000 | Stinson et al. |
| 6,149,056 A | | 11/2000 | Stinson et al. |
| 6,164,528 A | * | 12/2000 | Hills et al. ................... 235/379 |
| 6,202,055 B1 | * | 3/2001 | Houvener et al. ............ 705/44 |
| 6,222,914 B1 | | 4/2001 | McMullin |
| 6,230,148 B1 | | 5/2001 | Pare, Jr. et al. |
| 6,286,756 B1 | * | 9/2001 | Stinson et al. .............. 235/379 |
| 6,310,966 B1 | | 10/2001 | Dulude et al. |
| 6,327,573 B1 | | 12/2001 | Walker et al. |
| 6,328,207 B1 | * | 12/2001 | Gregoire et al. ............ 235/379 |
| 6,330,543 B1 | | 12/2001 | Kepecs |
| 6,334,109 B1 | | 12/2001 | Kanevsky et al. |

(Continued)

OTHER PUBLICATIONS

S. Davies. Touching Big Brother. How Biometric Technology Will Fuse Flesh and Machine. Information Technology & People. vol. 7 (4) 1994.

(Continued)

*Primary Examiner*—Ahshik Kim
(74) *Attorney, Agent, or Firm*—Duane S. Kobayashi (57) ABSTRACT

A system for authorizing a check cashing transaction between a consumer and a merchant using identity verification based on biometric information. A system comprises a central biometric information database containing biometric and personal identity-verifying data registered therein by a consumer and containing merchant identity-verifying data registered therein by a merchant. The system further comprises a merchant local device having a biometric reader and linked via a network to the central biometric information database. Using the biometric reader, a consumer desiring to cash a check presents biometric data to the central biometric information database via the biometric reader. The central biometric information database provides an electronic comparison of the present biometric data with the biometric data registered by the consumer. If the presented data and the registered data match, an approval signal is transmitted to the merchant local device.

85 Claims, 3 Drawing Sheets

U.S. PATENT DOCUMENTS

| | | | |
|---|---|---|---|
| 6,389,401 B1 | 5/2002 | Kepecs | |
| 6,415,262 B1 | 7/2002 | Walker et al. | |
| 6,578,760 B1 * | 6/2003 | Otto | 235/379 |
| 6,592,029 B2 * | 7/2003 | Brikho | 235/379 |
| 6,659,341 B1 * | 12/2003 | Wang | 235/379 |
| 6,728,397 B2 | 4/2004 | McNeal | |
| 6,758,394 B2 * | 7/2004 | Maskatiya et al. | 235/379 |
| 6,786,398 B1 * | 9/2004 | Stinson et al. | 235/379 |
| 2002/0062249 A1 | 5/2002 | Iannacci | |
| 2002/0077890 A1 | 6/2002 | LaPointe | |
| 2002/0112177 A1 | 8/2002 | Voltmer et al. | |
| 2003/0009382 A1 | 1/2003 | D'Arbeloff et al. | |
| 2003/0236704 A1 | 12/2003 | Antonucci | |
| 2004/0054587 A1 | 3/2004 | Dev et al. | |
| 2004/0088295 A1 | 5/2004 | Glazer et al. | |
| 2004/0234117 A1 | 11/2004 | Tibor | |

OTHER PUBLICATIONS

Lawrence Aragon. Show me some ID. PC Week Online (http://www.zdnet.com/pcweek/news/0112/12bio.html) Jan. 1998.

Gerald Lazar. Agencies Scan Biometrics for Potential Applications. FCW.com (http://www.few.com.pubs.few.1997/0120/feature.htm) Jan. 1997.

Comparison of Biometric Identification Methods. http://www.and.nl/id/gen_biom.html. Dec. 1998.

The Speech Recognition API (SRAPI) Committee Announces Support for Speaker Verification. http://wwww.srapi.com/svapipr.html. Oct. 1996.

New Technology Enables Computers to Identify, Verify User Voices. http://www.srapi.com/savpi/pr041597.html. Apr. 1997.

Accounting 5544. Biometric Technology. http://acctserver.cob.vt.edu/faculty/jhicks/acct5544/present/ddeverea.htm. Apr. 1997.

Vault FAQs. http://www.ImagineNation.com/Xanadu/Vault. Jun. 1997.

John Daugman. The Scientific Basis for Iris Recognition. http://www.iriscan.com/basis.htm. Dec. 1998.

Electronic Banking 1. http://wwww.sjb.co.uk/eb1.html. Aug. 1998.

Biometric Technology Today (Btt). vol. 6(5) Sep. 1998.

Biometric Digest. Mar. 1998.

Biometrics in Human Services. vol. 2(1) Feb. 1998.

Biometric Access Corporation Debuts Enhanced Secure Touch-n-Pay Solution at FMI MARKETECHNICS 2002 Event, Press Release, Feb. 1, 2002.

Secure Touch-n-Pay RVS, 2003.

Biometric Access Company, Retail Industry Solutions, 2004.

BioPay Biometric Payment Services, Version 2.9 User's Manual, Mar. 1, 2001.

"The Biometric Bar Tab Project," http://www.csec.wvu.edu/wise/biometric/index.htm, including Dec. 9, 2002 Proposal and May 5, 2003 Team Report.

MophoTouch™—Multi-Application Finger Identification in the Palm of Your Hand, Sagem Morpho, Inc., 1999.

* cited by examiner

SYSTEM AND METHOD FOR BIOMETRIC AUTHORIZATION FOR CHECK CASHING

BACKGROUND OF THE INVENTION

This application relates generally to the cashing of payroll and other checks authorized through a shared database using a biometric for identification, specifically the cashing of payroll checks authorized biometrically through biometric comparisons at a central database, a local database, or a local device.

Fraudulent checks and IDs are becoming increasingly common due to the availability of inexpensive color printers and check and ID forging software. Essentially, anyone can create and print high quality, fraudulent checks and identification cards.

Consequently, cashing payroll and other checks is becoming increasingly costly for both honest check presenters (hereinafter "consumers") and check cashers (hereinafter "merchants") due to criminals who present fraudulent checks and IDs. Merchants are negatively affected by check and ID fraudulence because they lose money to criminals when they cash a counterfeit or fake check. In turn, to compensate for this lost money, merchants must raise the fees they charge for cashing checks, thereby affecting all consumers as well.

Mechanisms of preventing check fraud include systems that manage 1) negative databases of checking account numbers, 2) negative databases of driver's licenses, and 3) check cashing allowances with merchant issuance of check-cashing cards.

A negative database of checking account numbers is effective in preventing fraud only if the check's account holder is the fraudulent party or a hold has been put on the account due to fraudulent activity. However, such databases are not foolproof. They are not capable of stopping criminals from stealing a legitimate account-holder's checks, forging them, and then cashing them with a fake ID, nor do they prevent criminals from stealing an innocent person's account number(s) and printing counterfeit checks for that account.

There are also problems with negative databases of consumer's driver's license numbers because criminals often use fake IDs to cash their fraudulent checks and can simply discard those used for previous fraudulent transactions and create new ones.

The third system, merchant-issued check cashing cards, is as riddled with problems as the first two fraud detecting systems. Chances are, if a criminal gets an innocent account holder's wallet, the wallet will not only include the account holder's blank checks but will also include their merchant-issued check cashing card. Therefore, the check-cashing card poses a greater risk to the innocent account holder because once the criminal has the account holder's checkbook and check cashing card, they can cash numerous checks without raising suspicion.

An added disadvantage of the last two systems is that both require a man-made token or device in order to carry out the check-cashing transaction. Certainly, people have become accustomed to carrying around such tokens, but their wallets are continually growing with the number of cards added to them daily.

Alternative solutions to the above-described systems include various other more technologically advanced proposals that use biometrics to verify the identity of a consumer desiring to cash a check. One such proposal is outlined in U.S. Pat. No. 6,145,738 and in U.S. Pat. No. 6,149,056. This system, however, is automated and does not connect the merchant with the check cashing process. Therefore, the system is not a service offering to help merchants establish consumer loyalty and a strong consumer base.

Other systems that use biometrics to verify the identity of a consumer presenting a check have been proposed. However, such technology is only protects a merchant against fraudulent behavior by checking a consumer's biometric and the presented check number against a local database that resides on the merchant's server. Said database of information is not shared among merchants and therefore might effectively alert a merchant of a consumer's fraudulent activity if that consumer displayed fraudulent behavior in their store. However, if the consumer displayed fraudulent behavior within the system at another store, the merchant would never know because merchants enrolled in such a system do not share consumer information.

In view of the above-described inefficiencies and vulnerabilities associated with the conventional methods of reducing check fraud, it is apparent that what is needed is a more effective system of check cashing and ID verification.

SUMMARY OF THE INVENTION

The present invention provides a number of objects and advantages for use in detecting check fraud and identity fraud in the context of transactions that involve check cashing and any transactions where a check is proffered as payment.

One aspect of the present invention is that it provides merchants with a shared database of negative information of enrolled consumers and of checking accounts with previous fraudulent activity.

Another aspect of the present invention is that it allows merchants to confirm the identity of consumers desiring to cash payroll or other checks using only biometrics (and, optionally, an identification number) without the use of any identity-verifying, man-made token.

It is also an aspect of the present invention to allow merchants to reduce their financial transaction costs associated with fraud by creating a database of consumer fingerprints associated with transaction history information that can be used to accept or decline transactions.

An aspect of the present invention is to provide an identification system and method for check cashing purposes that is more convenient, more secure, less cumbersome, and easier to use for both the merchant and the consumer than methods currently practiced.

An additional aspect of the present invention is that it speeds up the check-cashing process for both the merchant and the consumer by eliminating the need for the consumer to present, and the merchant to verify, various identity-verifying, man-made tokens, such as a driver's license, other government issued IDs, check-cashing card, and/or a passport.

It is also an aspect of the present invention to provide a merchant manager with the extra security of an identification check that does not solely rely on a merchant clerk to responsibly collect, enter, and process information from the consumer.

Another aspect of the present invention is that it allows a merchant to set parameters for accepting/declining a check.

An aspect of the present invention is to allow the consumer to enroll biometric and account data at any check cashing location or any location with the appropriate equipment.

A further aspect of the present invention is to provide consumers with a more convenient way of identifying themselves that doesn't require them to supply any man-made identification tokens during a check-cashing transaction and, thus, minimizes the identification they are forced to carry on their persons.

Still another aspect of the present invention is that it allows merchants to reduce overall check cashing/acceptance costs by sharing the file of consumers with outstanding items across a broad number of merchants.

Helping merchants create a loyal consumer base is another aspect of the present invention.

Another aspect of the present invention is that it allows consumers to partially enroll for the system's services at a remote device to speed enrollment at the local device located in the merchant's store.

It is also an aspect of the present invention to allow merchants the ability of possessing digital and paper-based records of their check-cashing transactions.

An aspect of the present invention is that it allows merchants to set within the system their check cashing transaction fees, for ease of fee calculation during a check cashing transaction and ease of fee updating whenever fees change.

Yet another aspect of the present invention is that it allows merchants the security of a system guarantee service that reimburses them for returned checks if the check fits within set system parameters.

The present invention may be embodied as a system and as a method for the authorization of a financial transaction using a biometric sample. Methods of practicing the present invention are reflected in an enrollment process and a transaction handling process.

The enrollment method includes data entry, transmission of data, and a comparison. In the data entry portion, an enrolling consumer presents their biometric(s), personal information, and financial account data to a merchant linked to the invention's central database and the merchant's database (hereinafter, the local database). In a first transmission step of the enrollment, the consumer's enrollment data is sent to a central database. In the comparison portion of the enrollment, the central database compares the newly entered enrollment biometric(s) and personal information, such as an identification number (ID #), social security number (SSN), and phone number, to previously registered data. This comparison step is to prevent a consumer from enrolling in the system of the invention more than once or to prevent a consumer with fraudulent financial history from enrolling in the system. The consumer's enrollment is either accepted or denied. If accepted, the consumer's registered data is stored in the central database and may optionally be stored in the local database. Storing the biometric data in the local database allows for quicker account access and data backup.

Another method embodiment of the present invention is a transaction method that includes data entry and a transmission portion. The transaction process starts with a data entry portion during which the consumer enters at least one registered biometric sample, the check data is entered, and the merchant enters the amount of the check and, optionally, enters the date and an image of the check.

In the transaction process transmission portion, the data is sent to the central database for identity verification and a negative information screen. If the database cannot identify the consumer, the merchant may search for the consumer by entering the consumer's phone number, name, or any other info the consumer may have enrolled. Additionally, the consumer may enter a secondary ID # which would be any number the consumer registered during enrollment, such as but not limited to a phone number, SSN, or driver's license number, or a consumer may enter another biometric registered during enrollment. This biometric entry might be another fingerprint scan or any other biometric read.

When a match is found, that match along with the account number on the check are both checked against the central database's marked negative and warning accounts to verify that neither the consumer nor the account number have a history of fraudulent or suspicious activity. Accounts that are either marked with a warning or marked as having negative transaction history are accounts that are shared among the plural merchants registered in the transaction approval system. If neither the consumer's info nor the check info is marked negative or marked warning within the system, the transaction is automatically approved according to preset parameters and the merchant and consumer are notified.

The invention's central database may be configured to approve transactions based upon any number of factors. Existing balances or credit limits might be used but may not be the only data used to determine approval. Credit scoring from one or more internal databases, one or more external databases, or both internal and external databases may also be used to provide a more flexible approval approach.

According to one embodiment of the present invention, a combined enrollment/transaction process allows a consumer to enroll into the system of the invention and then proceed to cash a check within the same transaction.

Although a number of salient features of the present invention have been described above, the detailed description that follows provides a fuller exposition of additional features of the invention as it is embodied in various forms.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purposes of description and should not be regarded as limiting.

As such, those skilled in the art will appreciate that the invention, upon which this disclosure is based, may readily be utilized as a basis for the designing of other structures, methods, and systems for implementing the several aspects of the present invention. It is important, therefore, that the claims be regarded as including such equivalent constructions insofar as they do not depart from the spirit and scope of the present invention.

BRIEF SUMMARY OF THE DRAWINGS

Additional objects and advantages of the present invention will be apparent in the following detailed description read in conjunction with the accompanying drawing figures.

DETAILED DESCRIPTION OF THE EMBODIMENTS

As noted above, the present invention encompasses a system and method for authorization of a check cashing transaction using either a biometric sample only or a biometric sample in combination with an ID #.

Figure 1:
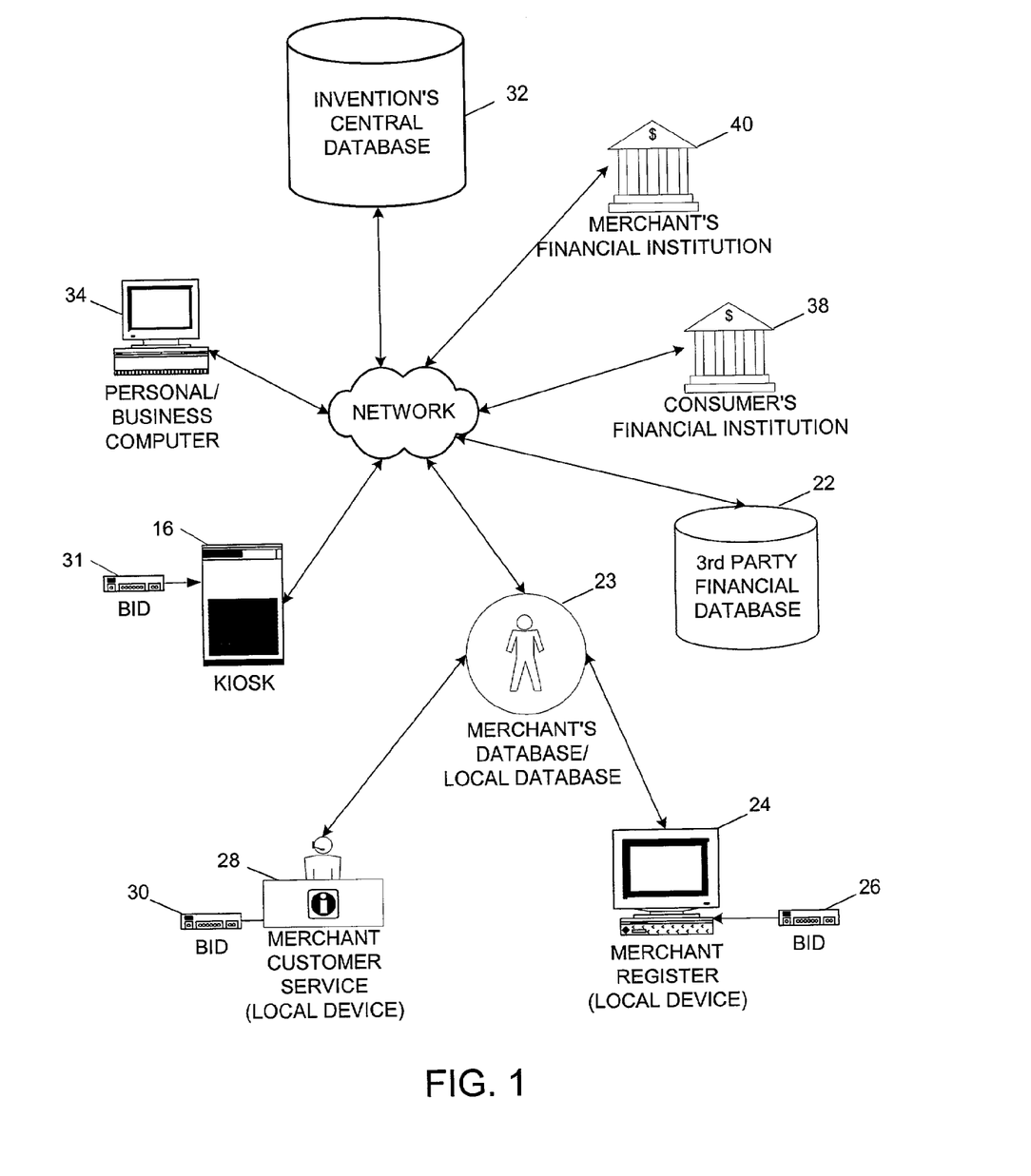
FIG. 1 illustrates a general architecture overview of a system for biometric authorization for check cashing according to an embodiment of the present invention.

Referring to FIG. 1, a general architecture overview of a system for biometric authorization for check cashing according to an embodiment of the present invention is illustrated. One aspect of the system embodiment of the invention is the central database, which holds consumer system accounts and a list of all checking account numbers, along with their related financial data, that have been presented to the system. Accounts within the central database may be unmarked, marked negative, or marked warning. System accounts marked as either negative or warning are accounts that are preferably shared across all merchants registered with the system of the invention. Sharing this information among all registered merchants helps merchants prevent engaging in transactions with consumers enrolled in the authorization system whose accounts displaying negative or suspected negative financial activity.

The central database is connected to a network, which is connected to a number of other entities. These entities include, but are not limited to: 1) the Internet, through which the central database can communicate by a remote device such as but not limited to a personal or business computer 34 with businesses or consumers who would like to pre-enroll for the services provided via the system; 2) at least one registered merchant 23, who can enroll consumers into the system and authorize or decline financial transactions based upon shared information consumers, merchants, or financial institutions have registered with the central database; and 3) various financial institutions and databases 38, 40, 22, through which the central database communicates about consumers', third party check writers', and merchants' financial accounts.

A consumer may complete a full enrollment registration for the invention's services at any merchant station 24, 28 equipped with a biological identification device (hereinafter BID) 26, 30. Such merchant stations may include but are not limited to a merchant's checkout register 24 with attached BID 26 or a merchant's customer service counter 28 with attached BID 30. The BID may be a fingerprint reader, a voiceprint reader, an iris recognition device, or any other type of biological identification device known in the art. For purposes of illustration only and without limitation, BIDs referred to in this application will be discussed as being fingerprint identification devices.

A consumer may also pre-enroll, that is provide a partial enrollment by providing only a portion of the required enrollment information, for the invention's services via a computer 34, or a kiosk 16, which is connected to a network (preferably but without limitation the Internet) that is connected to the central database 32. Businesses may also pre-enroll employees for the system. In doing so, a business might register with the central database a list of employees, their employee numbers, or any other information that the employee is willing to share with the system for pre-enrollment purposes. Other forms of pre-enrollment may include registering with the central database purchased or acquired database information that might supply the system with various individual's information. This information could be easily entered into the central database 32 so that when a consumer whose information was recorded in one of those databases wants to enroll in the system of the invention, all of their information contained within the purchased database would already be available within the system embodied according to the present invention and would not need to be entered at the time of enrollment, thus saving time for both the consumer and the merchant during enrollment.

As mentioned above, pre-enrollment may be conducted by a consumer or a business through any PC 34 connected to the central database 32 or at any kiosk 16 with a connected BID 31. The pre-enrollment will create a partially complete account that would be marked as a pre-enrollment.

Also connected to the invention's central database 32 via the network are various banks or financial institutions 38, 40 with which the consumer and the merchant hold financial accounts.

Also connected to the central database 32 via network is at least one merchant 23 with at least one station equipped with the invention's processing equipment, illustrated here as but not limited to either a customer service desk 28 or a cash register 24, both equipped with a BID 30, 26.

Figure 2:
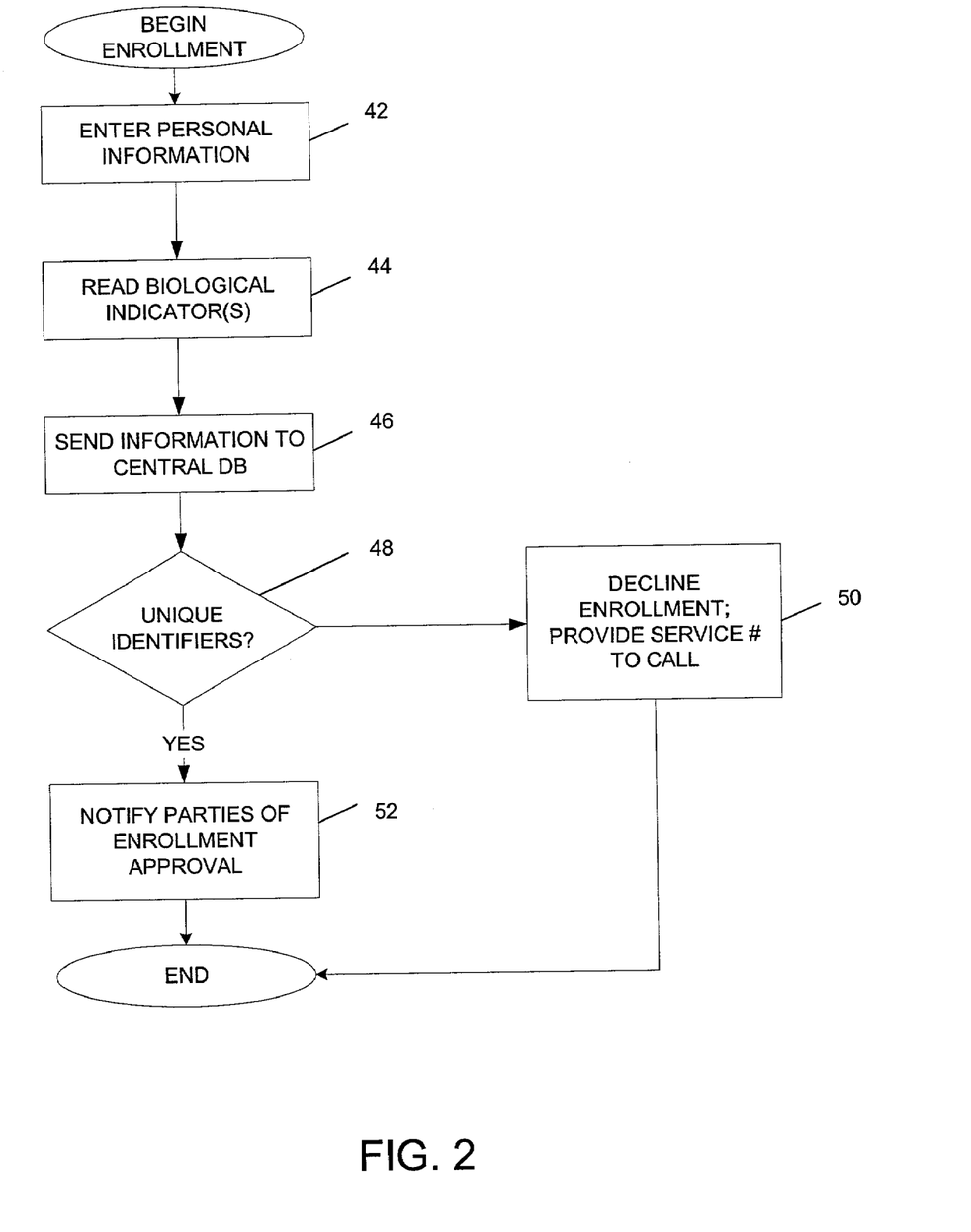
FIG. 2 illustrates a flowchart of a process for consumer enrollment into the biometric authorization for check cashing system according to an embodiment of the present invention.

Referring to FIG. 2, a flow chart of the initial enrollment process according to an embodiment of the present invention is illustrated. The consumer begins enrollment at a customer service desk with a BID or at a checkout lane with a BID. A merchant or merchant clerk preferably scans the consumer's personal identification information 42, which may simply be driver's license data or include social security number, address, phone number, or any other identification information about the consumer. An example includes a consumer's driver's license data being read automatically by a magnetic stripe reader, 2-D bar code reader, smart-code reader, or other method of storage and transfer of data. Optionally, this data may be hand-keyed.

The consumer then enters their biometric data by placing one of their fingers on the BID 44. As another option, more than one type of biometric data may be scanned. For example, the invention's system may be configured to accept a fingerprint biometric along with a face scan biometric. In addition, the system may be configured to read two or more of the same type of biometric. For example, if the system requires a fingerprint biometric, then multiple fingers may be scanned and stored in the consumer's system account. This enables a consumer the freedom of presenting either of their previously scanned fingers for identification, for financial account authorization within the system of the invention, or for system account maintenance.

Also at this point 44 or in the previous step 42, an optional system ID # may be chosen and entered by the consumer. This ID # may be used for extra security or for information organization purposes within the system of the invention. The ID # may be unique, reasonably unique, or non-unique. A reasonably unique ID # is preferred for this invention. The consumer may also choose to have an ID # assigned to them. In such a case, numbers such as but not limited to the consumer's social security number, phone number, or date of birth may be selected. All data entered in these steps 42, 44 of the enrollment process is transmitted to the central database 46 via a network such as the Internet.

A unique number is defined as a number with no chance of being honestly duplicated. For example, a social security number is unique and can only be duplicated in the event of fraud. A reasonably unique identifying number is one that has a statistically small chance of being duplicated. A reasonably unique identifying number may also be one that is intentionally common to a small, select group of individuals, say members of a family, or partners in a business, such as a phone number. A non-unique number is one with a large chance of being duplicated. These are usually small numbers such as an ATM PIN. Systems requiring the consumer to enter their registered ID # for verification may also be configured to allow the consumer to enter a secondary ID # in the event that they forget their registered ID #. Said secondary ID # might be any number the consumer registered during enrollment, such as but not limited to a home phone number, work phone number, social security number, or driver's license number.

At this point 48 in the enrollment process embodiment of the invention, the central database compares the consumer's personal information and biological identifiers entered in prior steps 42, 44 to other registered data within the system's central database for uniqueness. In checking for re-enrollment, the central database searches data contained therein to verify that the enrolling consumer's data is nowhere in the system of the invention. If the enrolling consumer's data is not found in the system, the consumer's enrollment is accepted and the enrollment process continues 52.

If an enrolling consumer's data is found anywhere in the system's central database and the account where the duplicate information is found is not marked as a pre-enrollment account, the enrollment may or may not be rejected. More specifically, any type of identification of the enrolling consumer within the central database, and that is not related to a pre-enrollment, may result in one of two results. One, the consumer may be positively identified, meaning a portion or all of their identification data was matched in an account not marked negative or warning. Two, the consumer may be negatively identified, meaning a portion or all of their identification data was matched in either an account marked negative or an account marked warning.

Despite the type of identification during an enrollment process—positive or negative—the system may be configured to automatically decline the consumer's enrollment and may also be configured to provide a reason for the decline, which may include displaying to the merchant one or more fields wherein the enrolling consumer's identification data was found in the system, thereby supplying a reason for said decline. Optionally, the system may display both a reason for the decline and display the one or more fields wherein the enrolling consumer's identification data was found in the system.

The system may also be configured to allow the merchant to decide whether or not to accept an enrollment from a consumer positively identified within the system. In such a scenario, the system would alert the merchant of the positive identification, would display the field(s) or the entire account record existing within the system which caused the positive identification of the enrolling consumer, and would prompt the merchant to either accept or decline the enrollment. The merchant would then either accept or decline the enrollment manually or the merchant would accept or decline the enrollment automatically, based upon whether or not the merchant had set enrollment acceptance parameters before that enrollment session.

In the case of a positive identification during an enrollment, despite whether the merchant is given the option to accept or decline the enrollment, the system account containing the field or fields which generated said positive identification may be marked as a warning account to denote the possibility of that account containing fraudulent data. The result of this marking would cause the central database to generate a warning to the merchant when the account was retrieved for access.

If the enrolling consumer's data is not found in the system's central database, the enrollment is accepted. The merchant and consumer are notified of the outcome 52. If the enrollment is declined 50, whether it is declined by the database, the merchant, or merchant pre-set parameters, the enroller is given the opportunity to call the system's customer service. This contact may be immediately available at the point of enrollment. If all information is unique in 48, the enrollment is accepted 52, the merchant and enrolling consumer are notified of the enrollment acceptances, and the consumer may proceed to cash a check.

Figure 3:
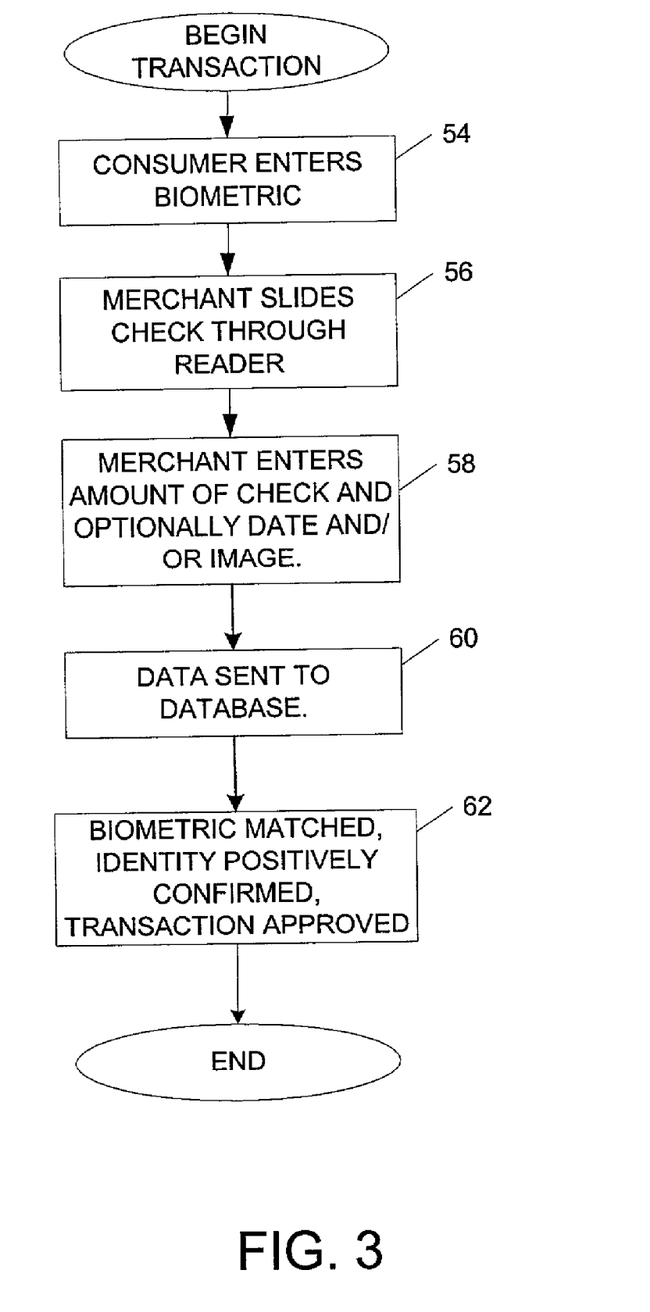
FIG. 3 illustrates a flowchart of a process for a consumer transaction using the biometric authorization for check cashing system according to an embodiment of the present invention.

Referring to FIG. 3 a flow chart of a transaction process according to an embodiment of the present invention is illustrated. The consumer desiring to cash a check provides their biometric 54. The merchant then slides the check through a check reader 56 and keys in the amount of the check and any other desired information, such as the date or an image scan of the check 58. All transaction data is sent to the invention's central database 60, and the consumer's biometric scan is compared to various other biometrics within the system for potential matches. In addition, at least one field of information on the presented check is checked against one field in the list of checks previously presented into the system. Once a match for the consumer's biometric is found and approval parameters, such as the compared check field not containing negative or warning information, are met, the invention's central database sends notice to the local device that the consumer has been positively identified and the transaction has been approved 62. If either the consumer or the checking account number produces a negative match, the transaction will be declined with a reason. In addition, if the consumer is found in the warning database and no negative check information is found, the merchant may accept or decline the transaction at the merchant's discretion. The merchant's decision also may be automated by pre-set parameters.

All messages from the central database may be displayed on the register, customer service PC, or any other device connected to the BID.

In addition to the above-described method and system embodiments of the present invention, the invention will be advantageously integrated with existing financial data processing devices such as, but not limited to, Electronic Cash Registers (ECRs). The system might also be connected to one or more third party financial databases (e.g., without limitation, Equifax) that may be used to provide information on the financial activity of various enrolled consumers.

According to an optional embodiment, the system of the invention provides a merchant with a receipt of transactions in case of consumer fraudulence. For example, in the case of a returned check such functions might include the merchant running an activity report for a particular consumer whose check was returned. Said activity report may include any combination of useful information, including but not limited to the transaction number for the returned check cashed, a digital photo of the consumer, a record of the consumer's biometric(s), and various other consumer and transaction information to be used by the merchant in recovery efforts.

According to another optional embodiment, the system of invention allows the merchant to run system activity reports based upon merchant selected parameters. These reports are produced according to parameters including but not limited to a specified time period and may include information such as but not limited to the total number of transactions run during the time period, the total amount of fees charged during the time period, or the total number of checks cashed during the time period.

According to a further optional embodiment, the system of the invention allows a registered merchant to subscribe to a system guarantee service, wherein the system of the invention guarantees checks for a designated amount if they fit a certain profile. This guarantee preferably incorporates the invention's system reimbursing the merchant in the event that a check cashed with the system is returned. The reimbursement may be, but is not limited to, the entire value of the check, a pre-designated amount, or a percentage of the check value. This guarantee service allows merchants to cash checks with a smaller risk of losing money on fraudulent checks cashed. Parameters indicating acceptable transaction profiles preferably include, but are not limited to, how the check is issued, the amount of the check, and the date of check issue.

Optionally, a system embodied according to the present invention provides the merchant with a consumer age verification ability. This would comprise the consumer being enrolled in the invention's system and would also comprise their birth date being entered during enrollment. This would allow a merchant to verify the age of a consumer enrolled in the central database in order to allow the consumer to purchase age-restricted material. This account access utilizes a consumer account access device, via which the consumer would provide their biometric to allow the merchant to access the consumer's account information.

The following description of system features provide additional value and may be implemented as alternative embodiments of the present invention.

Instead of the merchant's equipment communicating directly with the central database during the enrollment and transaction steps, a system according to an alternative embodiment is configured to communicate with the local database at any one or all of the transmission or reception steps within the enrollment or transaction process. The merchant need only connect to the central database to authorize money transfers from transactions logged earlier in the day and to sync with the central database's shared list of negatively marked accounts.

The order in which data is entered, either in the enrollment process or in the transaction process, is not essential to practice of the present invention. For example, it is permissible for the merchant to start a check cashing transaction by scanning the check into the system first, and then the merchant may ask the consumer to enter their biometric, etc. It is noted that there is no necessary order for data entry. The present invention encompasses entry of data in any order.

During the enrollment step, the system according to another alternate embodiment of the invention (or the merchant) may require that the enrolling consumer enter an ID #. This ID # may be used to increase transaction security and speed. The ID # may be a unique number, reasonably unique number, or non-unique number.

According yet another alternate embodiment, additional data is automatically added to the data packet transmitted to the central database in the first transmission step, examples of the additional data including (but not limited to) a local device ID #, a consumer's account information in the case of a personal check (including ABA, account and check numbers), the check writer account information in the case of a third party check (including ABA, account and check numbers), a transaction amount, and a merchant ID #.

According to still another alternate embodiment, the system is configured to incorporate digital images into the verification process.

A transaction may be declined, provide a warning, or perform any other response to the result of the negative database comparison, using parameters that have been set in advance by the merchant.

As a further alternative, the system is configured in velocity terms, where certain transactions are declined based on one or more certain criteria, such as but not limited to transaction dollar amount, transaction frequency, or change of employers. For example, check acceptance may be regulated by velocity settings where additional parameters would be based on one or more of the following: 1) the dollar amount of checks a consumer presents in a certain time period, 2) the number of checks the consumer presents in a certain time period, 3) the number of checks presented from the same check writer's within a certain time period, 4) a check writer's total dollar amount in a certain time period, 5) specific check series numbers (e.g. don't accept checks 1–300 and 1000–1300).

For both the enrollment process and the transaction approval process, the system according to an alternate embodiment presents the merchant with the ability to preset their own approval parameters. For example, the merchant may decide not to accept checks from a certain employer or may decide not to accept third party checks other than payroll checks. In another example, the merchant might decide not to accept two checks written from the same checking account in one day or may decide to limit the aggregated amount of checks cashed by a certain user within a set period of time.

Optionally, the system is configured to accept a scan of one or many of the consumer's picture IDs during the enrollment process.

According to another optional embodiment, the system is configured to accept a picture of the consumer upon enrollment or during transaction. The picture is advantageously either a digital capture or is scanned from an analog image. If data is captured during enrollment, it is available to serve as extra data within a consumer's BioPay account file. When this image data is captured during a transaction, it may be used for identification purposes to compare the picture with any other picture already in the consumer's system account file.

A system embodied according to the present invention may also be configured to check directly with one or more banks online to communicate positive or negative information that the bank may have (or could find useful) about a consumer.

The system may also be configured to automatically assess and deduct the merchant's check cashing fee for providing the check cashing service during a transaction. Each merchant may pre-set their system profile to automatically calculate and deduct the check cashing fee based upon certain parameters during a check cashing transaction. Check cashing fees may be set as flat fees, percentage fees, or a combination of both. For example, if a check is $50, the merchant may set it to deduct 2%; if a check is only $5, the merchant may set the system to deduct a flat fee of $0.10; if a check is $100, the merchant may set the system to deduct 2% plus $0.10. Each merchant is free to independently set his own parameters for check cashing fees.

Preferably, the system is configured for a multi-merchant enrollment. Such enrollment allows merchants within the same chain to share both positive and negative consumer information stored in the invention's central database between themselves. It also enables a consumer to cash their checks at any of the merchant's stores within the chain without having to re-enroll at each store in the chain.

A biometric identification system for payroll and other check cashing transactions has been illustrated according to a number of embodiments. It will be appreciated by those skilled in the art that systems and methods according to the present invention are useful to perform check cashing transactions without presenting man-made identity-verifying tokens during these transactions. The invention can also be used to prevent fraud by customers previously added to or already existing on a shared negative database. It will thus be appreciated by those skilled in the art that various other variations of the present invention will be possible without departing from the scope of the invention as described.

What is claimed is:

1. A method for enrolling an individual in a biometric check cashing system, comprising:
   receiving identification information from an individual for enrollment in the check cashing system;
   transmitting said received identification information to a central database to determine whether a portion of said identification information already exists in an account in said central database, each of said accounts including registered biometric data;
   receiving, from the central database, additional enrollment information from an existing account in said central database, and an account status of said existing account;
   enrolling said individual in a local database using said additional enrollment information; and
   declining an enrollment request if said existing account does have a negative status associated therewith.

2. The method of claim 1, wherein said biometric data is a fingerprint scan.

3. The method of claim 1, wherein said biometric data is a voiceprint.

4. The method of claim 1, wherein said biometric data is an iris scan.

5. The method of claim 1, wherein said received identification information includes a biometric scan.

6. The method of claim 1, wherein said received identification information includes a personal identifier.

7. The method of claim 1, wherein said personal identifier is a unique number.

8. The method of claim 1, wherein said personal identifier is a reasonably unique number.

9. The method of claim 1, wherein said personal identifier is a non-unique number.

10. The method of claim 1, wherein said received identification information includes an identification number.

11. The method of claim 1, wherein said received identification information includes a social security number.

12. The method of claim 1, wherein said received identification information includes a phone number.

13. A method for enrolling an individual in a biometric check cashing system, comprising:
    receiving identification information from an individual for enrollment in the check cashing system;
    transmitting said received identification information to a central database to determine whether a portion of said identification information already exists in an account in said central database, each of said accounts including registered biometric data;
    receiving, from the central database, additional enrollment information from an existing account in said central database, and an account status of said existing account; and
    enrolling said individual in a local database using said additional enrollment information,
    wherein said enrolling comprises enrolling said individual in a local database using said additional enrollment information if said existing account does not have a negative status associated therewith.

14. The method of claim 13, wherein said biometric data is a fingerprint scan.

15. The method of claim 13, wherein said biometric data is a voiceprint.

16. The method of claim 13, wherein said biometric data is an iris scan.

17. The method of claim 13, wherein said received identification information includes a biometric scan.

18. The method of claim 13, wherein said received identification information includes a personal identifier.

19. The method of claim 13, wherein said personal identifier is a unique number.

20. The method of claim 13, wherein said personal identifier is a reasonably unique number.

21. The method of claim 13, wherein said personal identifier is a non-unique number.

22. The method of claim 13, wherein said received identification information includes an identification number.

23. The method of claim 13, wherein said received identification information includes a social security number.

24. The method of claim 13, wherein said received identification information includes a phone number.

25. A system for enrolling an individual in a biometric check cashing system, comprising:
    a central database that stores account information for individuals that are enrolled in the biometric check cashing system, each of said accounts including registered biometric data; and
    a local enrollment system at a local merchant site, said local enrollment system having a local database that stores account information for individuals registered for check cashing at said local merchant site, said local enrollment system being configured to receive identification information from an individual for enrollment, transmit said received identification information to said central database to determine whether a portion of said identification information already exists in an account in said central database, and receive, from said central database, additional enrollment information from an existing account in said central database and an account status of said existing account, wherein said local enrollment system enrolls said individual in said local database using said additional enrollment information.

26. The system of claim 25, wherein said biometric data is a fingerprint scan.

27. The system of claim 25, wherein said biometric data is a voiceprint.

28. The system of claim 25, wherein said biometric data is an iris scan.

29. The system of claim 25, wherein said received identification information includes a biometric scan.

30. The system of claim 25, wherein said received identification information includes a personal identifier.

31. The system of claim 30, wherein said personal identifier is a unique number.

32. The system of claim 30, wherein said personal identifier is a reasonably unique number.

33. The system of claim 30, wherein said personal identifier is a non-unique number.

34. The system of claim 25, wherein said local enrollment system declines an enrollment request if said existing account does have a negative status associated therewith.

35. The system of claim 25, wherein said local enrollment system enrolls said individual in said local database using said additional enrollment information if said existing account does not have a negative status associated therewith.

36. The system of claim 25, wherein said received identification information includes an identification number.

37. The system of claim 25, wherein said received identification information includes a social security number.

38. The system of claim 25, wherein said received identification information includes a phone number.

39. The system of claim 25, further comprising a storage system that stores an identifier of an entity associated with the biometric check cashing system.

40. The method of claim 25, wherein additional data is automatically added to any enrollment of an individual, the additional data being selected from one of a processing terminal identification number, merchant data, and transaction data.

41. The system of claim 25, wherein the individual is authorized to cash a check if it is determined that the individual has a credit score above a threshold value.

42. The system of claim 25, wherein said local enrollment system verifies an age of an individual.

43. The system of claim 25, wherein said registered biometric data includes two biometric scans of a same biometric type.

44. The system of claim 25, wherein said registered biometric data includes biometric scans of two different biometric types.

45. A method for a merchant to authorize a check cashing transaction, comprising:
   receiving, from a first entity, information regarding a check that is endorsed by a second entity;
   receiving, at a local device, a biometric scan of said first entity that is presenting said check for cashing;
   comparing said biometric scan of said first entity with registered biometric information, said comparison being used to determine whether said first entity is authorized to cash said check; and
   if said comparison indicates that said first entity is authorized to cash said check, then determining a fee for the check cashing transaction, wherein said determining includes accessing a system profile that has been predefined by the merchant and identifying based on said system profile which of a plurality of fees would apply to the check cashing transaction.

46. The method of claim 45, wherein said fees are one of flat fees, percentage fees and a combination of flat and percentage fees.

47. The method of claim 45, wherein said identifying is based on a value of said check.

48. The method of claim 45, further comprising determining whether to authorize the check cashing transaction based on velocity terms.

49. The method of claim 48, wherein said velocity terms include one or more of a transaction dollar amount, transaction frequency, change of employers, dollar amount of checks presented in a certain time period, number of checks presented in a certain time period, second entity's total dollar amount in a certain time period, and specific check series numbers.

50. The method of claim 45, wherein said accessing includes accessing one of a plurality of system profiles that are stored in a database, said plurality of system profiles being individually defined for a respective plurality of merchants that are served by a check cashing authorization service.

51. The method of claim 50, wherein said one of a plurality of system profiles is identified based on a merchant ID.

52. The method of claim 45, wherein said system profile is stored in a central database.

53. The method of claim 45, wherein said system profile is stored in a local database.

54. The method of claim 45, wherein said comparing comprises comparing at a central database.

55. The method of claim 45, wherein said comparing comprises comparing at a local database.

56. The method of claim 45, wherein said comparing comprises comparing at a local device.

57. The method of claim 45, wherein said biometric data is a fingerprint scan.

58. The method of claim 45, wherein said biometric data is a voiceprint.

59. The method of claim 45, wherein said biometric data is an iris scan.

60. The method of claim 45, further comprising receiving a personal identifier of said first entity that is presenting said check for cashing.

61. The method of claim 60, wherein said personal identifier is a unique number.

62. The method of claim 60, wherein said personal identifier is a reasonably unique number.

63. The method of claim 60, wherein said personal identifier is a non-unique number.

64. The method of claim 45, wherein said identifying comprises identifying which of a plurality of fees would apply to the check cashing transaction based on one or parameters that have been predefined by the merchant.

65. The method of claim 45, wherein said check information includes an amount of said check.

66. The method of claim 45, wherein said check information includes an image of said check.

67. The method of claim 45, further comprising storing an identifier of an entity associated with the biometric check cashing system.

68. The method of claim 45, further comprising accepting or declining said check based on parameters set by the merchant.

69. The method of claim 45, further comprising providing the merchant with a guarantee that reimburses the merchant if said check is returned.

70. The method of claim 45, further comprising determining whether said first entity or an account number for said check have a history of fraudulent or suspicious activity.

71. The method of claim 45, further comprising determining whether said first entity has a credit score above a threshold value.

72. The method of claim 45, wherein the check cashing transaction is part of a financial transaction.

73. The method of claim 45, wherein the merchant can disregard a warning of a potential fraudulent account.

74. The method of claim 45, further comprising verifying an age of said first entity.

75. The method of claim 45, further comprising generating for a merchant an activity report concerning the first entity's system activity.

76. The method of claim 45, further comprising issuing a warning to the merchant if the account on which the check is drawn has been flagged as a potential target of fraudulent activity.

77. The method of claim 45, further comprising issuing a warning to the merchant if said first entity's record indicates that said first entity has come under suspicion of fraudulent activity.

78. The method of claim 45, wherein said receiving at a local device comprises receiving two biometric scans of a same biometric type.

79. The method of claim 45, wherein said receiving at a local device comprises receiving biometric scans of two different biometric types.

80. The method of claim 45, wherein said comparing comprises comparing said biometric scan of said first entity with registered biometric information of said first entity.

81. The method of claim 45, wherein said comparing comprises comparing said biometric scan of said first entity with registered biometric information of a group of individuals.

82. The method of claim 81, wherein said comparing comprises comparing said biometric scan of said first entity with registered biometric information of all individuals in a database.

83. The method of claim 81, wherein said comparing comprises comparing said biometric scan of said first entity with registered biometric information of individuals in a negative database.

84. The method of claim 45, further comprising:
   communicating with a third party database to obtain additional financial information concerning said first entity; and
   accepting or rejecting the check cashing transaction based, at least in part, on the additional financial information.

85. The method of claim 84, wherein the third party database is one of said first entity's bank, said second entity's bank, and a financial database.

* * * * *